United States Patent [19]

Jorgensen

[11] 4,103,769

[45] Aug. 1, 1978

[54] LIVE ROLLER CONVEYOR

[75] Inventor: Morell L. Jorgensen, Honeoye Falls, N.Y.

[73] Assignee: Stone Conveyor, Inc. (Entire), Honeoye, N.Y.

[21] Appl. No.: 703,077

[22] Filed: Jul. 6, 1976

[51] Int. Cl.² ........................................... B65G 13/06
[52] U.S. Cl. .................................... 198/781; 198/789
[58] Field of Search ............... 198/780, 781, 788, 789, 198/790, 791

[56] References Cited

U.S. PATENT DOCUMENTS

| 3,122,232 | 2/1964 | Burt | 198/781 |
|---|---|---|---|
| 3,263,797 | 8/1966 | Lutes | 198/789 |
| 3,285,391 | 11/1966 | Fix | 198/781 |
| 3,416,642 | 12/1968 | Muller | 198/781 |
| 3,451,527 | 6/1969 | Leach | 198/781 |
| 3,549,002 | 12/1970 | Leach | 198/781 |
| 3,840,110 | 10/1974 | Molt et al. | 198/781 |
| 3,877,565 | 4/1975 | Werntz | 198/781 |

*Primary Examiner*—Evon C. Blunk
*Assistant Examiner*—Jeffrey V. Nase
*Attorney, Agent, or Firm*—Clarence A. O'Brien; Harvey B. Jacobson

[57] ABSTRACT

A live roller conveyor having a supporting frame and a plurality of load supporting transport or carrier rollers rotatably supported from the frame and a plurality of drive wheels in frictional driving contact with the rollers for frictionally driving the rollers. Certain of the drive wheels are powered from a power source and all of the drive wheels are spring biased toward the rollers. In one embodiment, the drive source is a line shaft having a friction drive connection to the powered drive wheels. In a second embodiment, the drive source is a small electric motor driving each powered drive wheel. A third embodiment includes a switch controlled solenoid for selectively engaging and disengaging the drive to the rollers. The drive sources and drive wheels may be arranged in many combinations to create separate and distinct drive zones of the load supporting rollers. The drive zones may be energized or deenergized by control mechanisms to provide positive load transport control.

10 Claims, 15 Drawing Figures

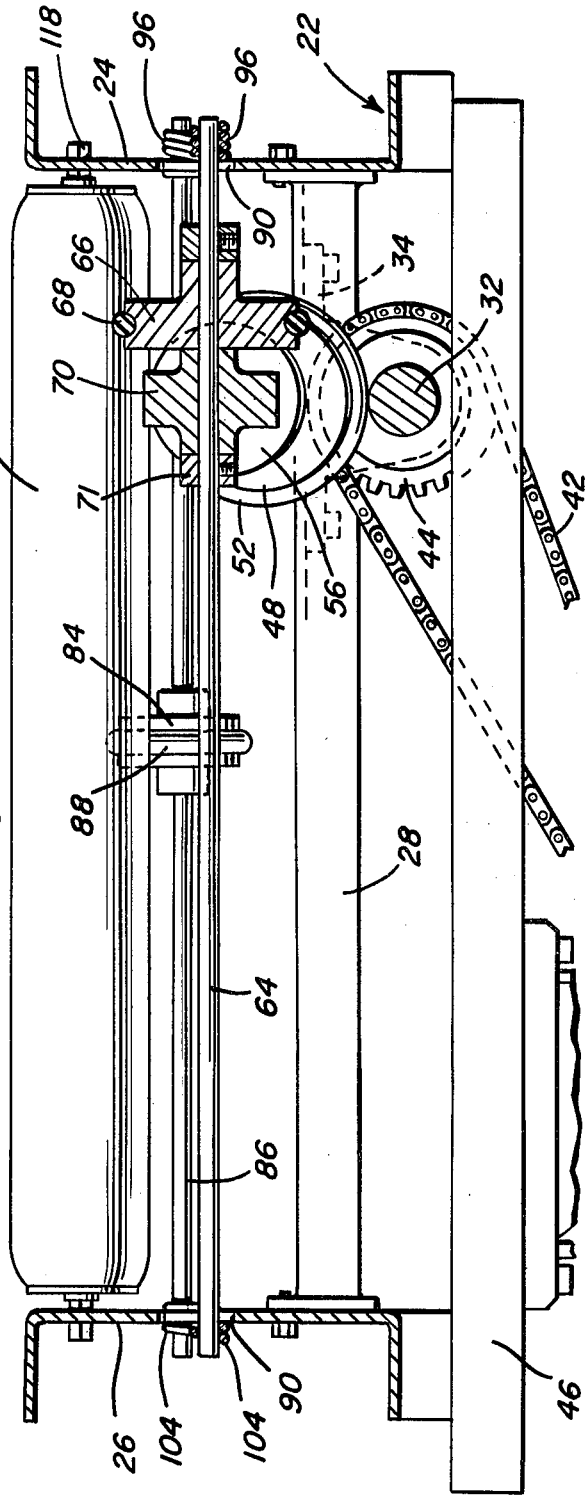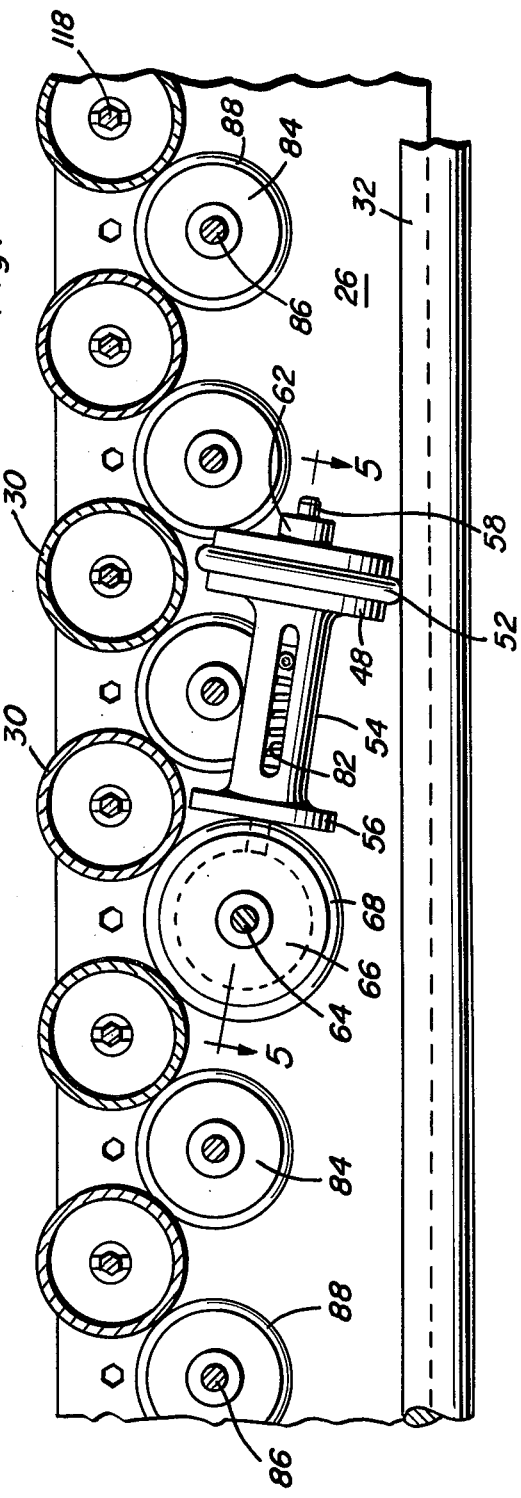

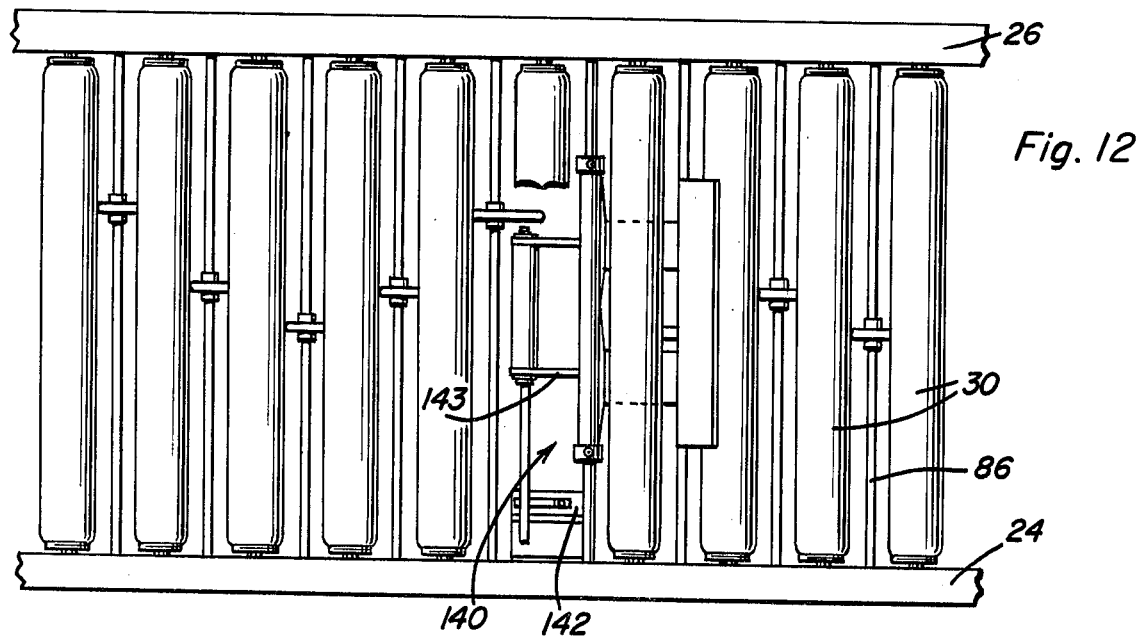
Fig. 12
Fig. 13
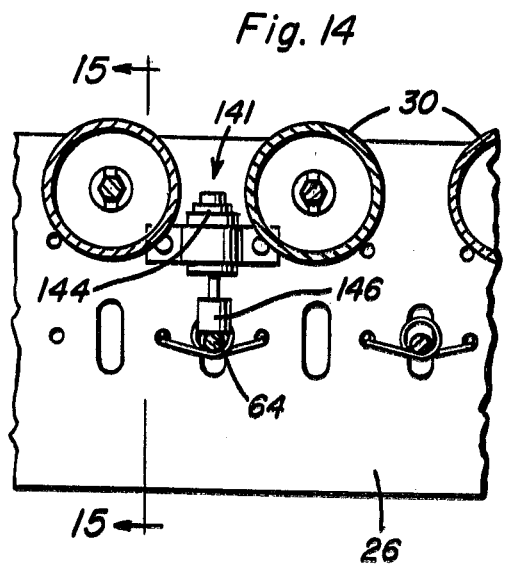
Fig. 14
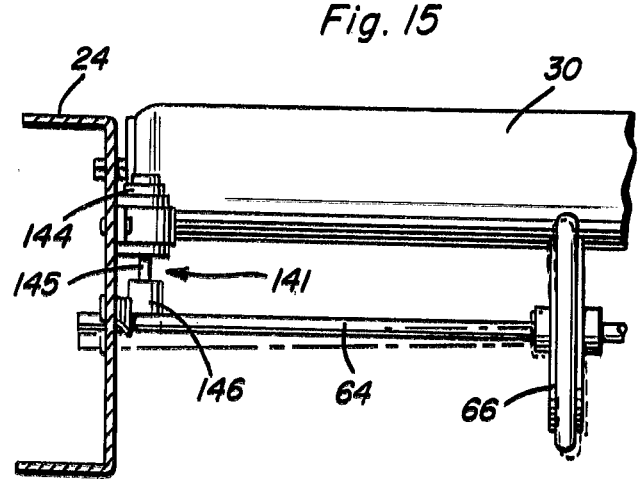
Fig. 15

4,103,769

LIVE ROLLER CONVEYOR

BACKGROUND OF THE INVENTION

1. Field of the Invention

The present invention generally relates to a live roller conveyor employing transport or carrier rollers rotatably supported from a frame to define a load bed and, more particularly, structural arrangements for effectively controlling rotation of the rollers by providing a unique friction drive train which make three distinct categories of conveyors, namely, live roller conveyors, minimum pressure accumulation conveyors, and zero pressure accumulation conveyors.

2. Description of the Prior Art

Conveyors employing rollers have been used in conveying various loads for many years and generally include a plurality of rotatable transport rollers which are driven in a manner to convey the load in a desired direction with the driving connection with the rollers being such to enable the load on the load bed, such as a plurality of boxes or other items, to stop and accumulate without adverse effect on the load or on the conveyor. Prior U.S. Pat. No. 1,903,732, issued Apr. 11, 1933, discloses such a conveyor in which a generally wide, flat drive belt underlies the transport rollers with pressure rollers underlying the drive belt and oriented in staggered relation to the transport rollers so that upward pressure on the drive belt will maintain it in frictional driving engagement with the transport rollers. Another example of the development in this field is found in U.S. Pat. No. 3,563,365, issued Feb. 16, 1971, in which the belt underlying the transport rollers is in the form of a relatively narrow V-belt engaged by underlying pressure rollers with the V-belt oriented at one side of the conveyor. U.S. Pat. No. 3,650,375 issued Mar. 21, 1972, discloses a live roller conveyor in which the rollers are driven by independent belts all driven from a single line shaft. Many other patents have been issued covering conveyors of this type with most of the patents being directed to solutions to the problem of maintaining a constant drive force on the transport rollers. Installational requirements for such conveyors vary quite widely and while accumulating conveyors have received substantial acceptance and are used extensively, the problem of maintaining a controlled driving force on the transport rollers remains a problem as does the installational flexibility.

SUMMARY OF THE INVENTION

An object of the present invention is to provide an accumulating conveyor in which the load bed is formed by a plurality of rotatable transport or carrier rollers having a driving force imparted thereto through drive wheels located under the rollers and in frictional contact with the periphery thereof.

Another object of the invention is to provide an accumulating conveyor in which certain of the drive wheels are powered and the other drive wheels frictionally and peripherally contact adjacent rollers to transmit the driving force from one roller to another.

A further object of the invention is to provide an accumulating conveyor in accordance with the preceding object in which the powered wheels are driven from a shaft paralleling the load bed with a friction drive wheel and friction clutch assembly interconnecting the surface of the shaft and the powered drive wheels.

Still another object of the invention is to provide a live roller conveyor in which the powered drive wheels are driven by a small electric motor having a friction drive wheel connected thereto.

Another important feature of the present invention is to provide a conveyor in accordance with the preceding objects in which the friction drive wheels engaged with the rollers are all spring biased toward the carrier rollers by means connecting at least one end of the wheel shafts to the conveyor frame.

This arrangement takes advantage of the inherently low friction of roller conveyors by not introducing significant binding forces on the transport rollers, the result being that much less horsepower is required to transport loads.

Another object of the invention is to provide an accumulation conveyor in which the driving forces are separated or zoned from one another. The driving forces may be engaged or disengaged as required to provide load transport forces from zero to the maximum required.

In most live roller and accumulation conveying packages and other relatively light loads, the rollers are driven by belts. In order to transmit torque to the rollers, considerable tension of the belt is required to transmit the torque required with minimal slipping. This tension creates relatively high loads on the bearing which leads to relatively high power consumption. In addition, the necessary belt flexing leads to significant additional power loss, probably greater than the bearing friction losses. With the present invention, quite low normal forces are sufficient to create the frictional forces necessary to transmit the required torque.

The practical manufacturing tolerances used in the conveying industry give rise to considerable variations in the dimensions which adversely affect the operation of a friction wheel drive of the rollers. First, the commercial roller is not truly circular in cross-section, but slightly oval or irregular, since they are made by seam welding light gage tubing. The tube may be slightly eccentric with respect to its axle. For the friction wheel to ride in continuous contact with two rollers, it must be free to float both vertically and horizontally in its plane. The spring mounting of the friction wheel axle both creates the vertical upward force on the axle which when transmitted to the friction wheel, creates the drive friction. In addition, both springs allow a limited degree of horizontal motion. Also, the small cross section of the axle allows it to flex. The friction wheel is thus enabled to float in its plane, so that contact with the rollers is maintained at all time. The variation in the normal forces is minimal. If the wheels are fixed instead of floating, large variations in the normal loading will occur. Note that the actual normal forces created in this construction are created by three "springs" in series: (1) the tension spring, (2) the bending axle, and (3) the compressed O-ring on the friction wheel.

Ideally, the axles of the two driven rollers and the associated friction wheel should all be parallel. If they are not, and if the plane in which the wheel is held is fixed, true rolling may not occur at the contact points. Skidding them will produce wear of the polyurethane tire. In this construction, the wheel is mounted on a commercial grade single row ball bearing which has sufficient slope so that the wheel can tilt slightly on the axle. That is, it has a small amount of self-alignment. This and the flexibility of the axle of spring continues to allow the wheel to orient itself under the urging of the forces acting into the plane where slipping will be minimized.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a transverse, sectional view of the conveyor illustrating the relationship of the drive shaft, friction driven wheel engaged with the periphery thereof, the friction clutch and friction drive wheel engaged with a transport roller.

FIG. 4 is a fragmental, longitudinal sectional view illustrating the drive shaft, driven friction wheel and drive wheel and friction clutch arrangement.

FIG. 12 is a fragmental plan view of the embodiment which allows the drive to be engaged or disengaged. The view illustrates a microswitch trigger for control and a solenoid for providing disengagement force.

FIG. 13 is an elevational view showing the mounting of the trigger switch of FIG. 12.

FIG. 14 is an elevational view showing the action of the solenoid of FIG. 12.

FIG. 15 is a sectional view taken along section line 15—15 on FIG. 14 showing further details of the solenoid.

DESCRIPTION OF THE PREFERRED EMBODIMENTS

Figure 1:
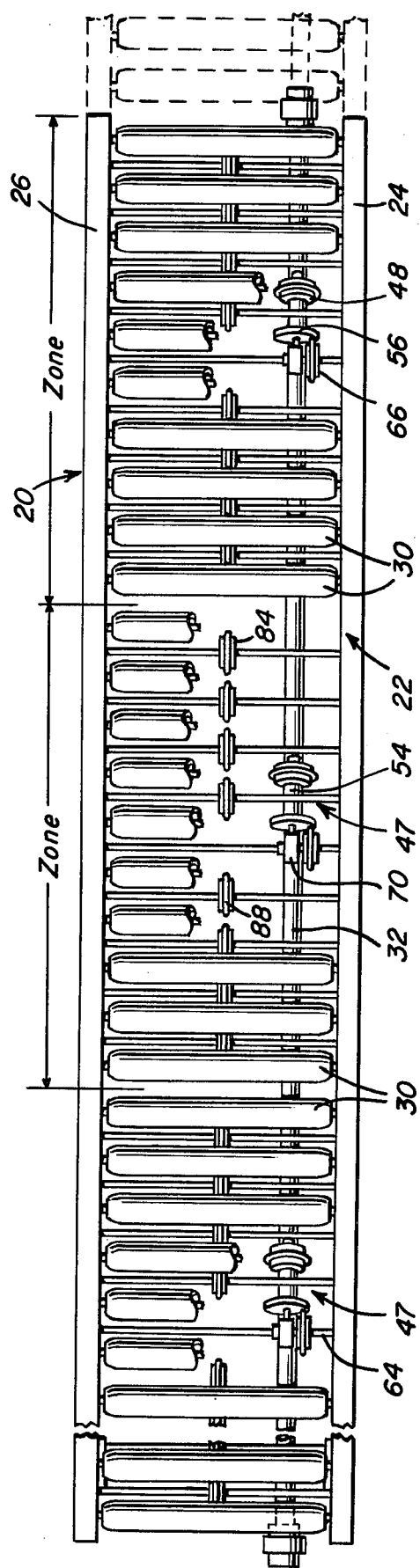
FIG. 1 is a top plan view showing a section of a zoned live roller conveyor constructed in accordance with the present invention.
Figure 2:
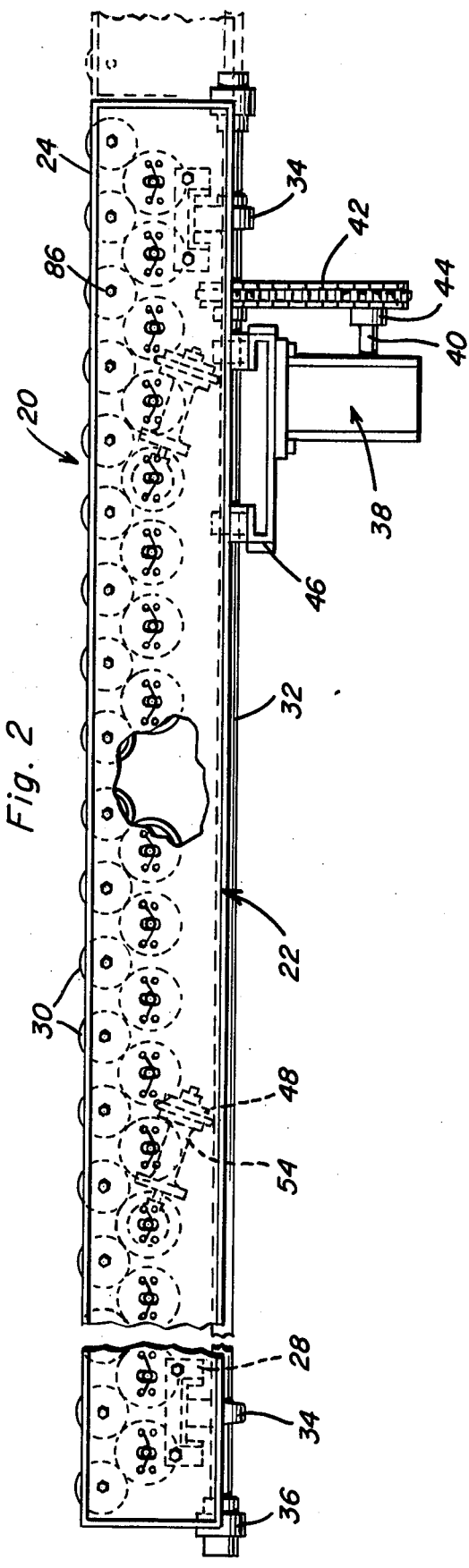
FIG. 2 is a side elevational view of the construction of FIG. 1.
Figure 5:
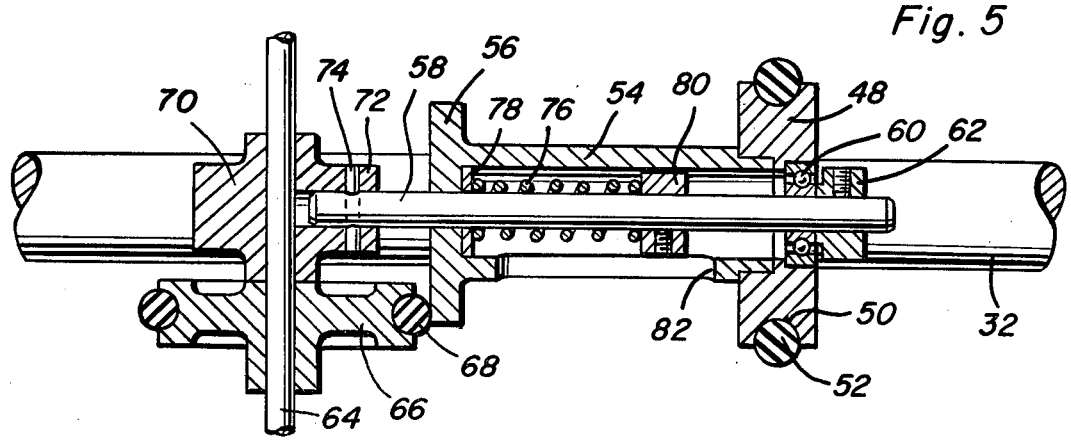
FIG. 5 is a detailed sectional view, taken substantially upon a plane passing along section line 5—5 of FIG. 4, illustrating further structural details of the driven wheel, friction clutch and drive wheel.

The live roller conveyor of the present invention is generally designated by reference numeral 20 with FIGS. 1 and 2 illustrating a typical section or module of the conveyor of a predetermined length so that any desired length of conveyor may be formed by connecting a plurality of modules in end-to-end relation. Each section is constructed with multiple zones with each zone including a small number of tread rollers and a separate drive wheel in a manner described hereinafter. If variations in direction or elevation are necessary, appropriately curved or otherwise specially constructed sections may be employed to enable flexibility of installation. The structural details for supporting the conveyor are not shown since the conveyor may be supported by legs, frames, suspension devices, and the like.

The conveyor 20 includes a frame 22 defined by longitudinal side rails 24 and 26 interconnected by cross members 28 to form a rigid structure with the rails 24 and 26 being preferably of channel shaped configuration with outwardly extending top and bottom flanges. The specific construction of the conveyor frame may vary and any suitable supporting structure may be provided for the frame. Supported between the side rails 24 and 26 is a plurality of transport or carrier rollers 30, also known as tread rollers, of cylindrical configuration and extending substantially throughout the distance between the rails 24 and 26 as illustrated in FIG. 3. The rollers 30 are spaced from each other a relatively short distance, such as a distance less than the diameter of the rollers to provide a load bed for movably supporting various items to be conveyed, such as cartons, boxes, or other items having a substantially flat surface area for engagement with the upper periphery of a plurality of transporting rollers 30, so that such articles may be conveyed longitudinally along the load bed and stopped at any desired location thereon to enable a plurality of the items to accumulate against each other or adjacent each other.

All of the transport rollers 30 are oriented at the same elevation with respect to the top edge of the side rails 24 and 26 and the upper peripheral portion thereof extends slightly above the top edge of the side rails 24 and 26.

The rollers 30 are separated into distinct zones, as indicated in FIG. 1, with each zone including a small number of rollers, such as ten, and each zone of rollers is independently driven.

The rollers 30 are driven from a power source in the form of an elongated line or drive shaft 32 disposed adjacent the side rail 24 in parallel relation thereto and inwardly thereof with the shaft 32 being suitably journaled by bearing blocks 34 supported from the cross members 28. The shaft 32 is sectional and is provided with coupling means 36 on each end thereof by which a plurality of sections of shaft may be interconnected when a plurality of sections of conveyor are interconnected. The line shaft 32 is driven by a power device such as an electric motor generally designated by numeral 38 provided with a suitable speed reduction device in order to drive an output shaft 40 at a desired speed with the output shaft being connected to the line shaft 32 through a suitable drive connection, such as a sprocket chain 42 and sprocket gears 44, one of which is mounted on the shaft 32. The drive motor 38 may be supported by suitable cross members 46 or the like secured to the frame 22 in any suitable manner.

Supported in driving engagement with the periphery of the line shaft 32 is a plurality of friction drive assemblies 47, one for each zone of rollers, which enables the friction drive assemblies to function without significant slippage or wear due to the low torque and power requirements for each zone. Each assembly 47 includes a driven wheel 48 having a peripheral groove 50 receiving an annular ring 52 of resilient material which generally is in the form of an O-ring with the material being rubber, neoprene or plastic material having a desired coefficient of friction so that as the annular member 52 rests against and engages the periphery of the shaft 32, the driven wheel or traction wheel 48 will be rotatably driven. The wheel 48 is fixedly secured to a tubular spindle or body 54 having a circular plate 56 on one end thereof. A supporting shaft 58 extends through the plate 56 and tubular spindle 54 and a ball bearing assembly 60 journals the wheel 48 from the shaft 58 which is stationary insofar as rotation is concerned. An adjustable collar 62 is mounted on the end of the shaft 58 adjacent the bearing 60 to retain the bearing 60 and thus the wheel 48, spindle 54 and plate 56 on the shaft 58. Supported on a transverse shaft or rod 64 is a friction drive wheel 66 which is also grooved and provided with an O-ring 68 thereon, which has it periphery in friction driving contact with the flat surface of the circular plate 56, so that as the circular plate 56 rotates, the friction wheel 66 will be correspondingly rotated on the shaft or rod 64. Also mounted on the shaft 64 is a support bracket 70 having a projection 72 defining a socket telescopically receiving the end of the rod or shaft 58. A roll pin 74 is inserted through the shaft 58 and the corresponding portions of the socket thereby securely fixing the shaft 58 to the bracket 70 so that it can pivot about the axis of the shaft 64. The bracket 70 and friction wheel 66 are retained in place on shaft 64 by suitable collars 71. Thus, as illustrated in FIG. 4, the friction driven wheel 48 along with the rod or shaft 58 may pivot or swing about the axis of the transverse rod or shaft 64, with the weight of the friction wheel 48 and its associated structure retaining the friction O-ring 52 in driving contact with the external peripheral surface of the line shaft 32.

The spindle 54 and plate 56 as well as the wheel 48 are urged toward the shaft 64 to provide a friction drive between the flat surface of the plate 56 and the O-ring traction tire 68 by the provision of a compression coil spring 76 disposed interiorly of the spindle 54 with one end abutting against a washer 78 disposed against the inner surface of the plate 56. The other end of the spring 76 is engaged with an adjustable collar 80 adjustably locked to the shaft 58 by a suitable set screw which is accessible through a longitudinal slot 82 in the spindle 54. This construction provides a friction clutch between the friction driven wheel 48 and the friction drive wheel 66 with the torque transmitting capability of this friction clutch being variable by varying the position of the collar 80 on the shaft or rod 58.

As illustrated in FIG. 4, the friction drive wheel 66 has its periphery engaged with a pair of adjacent transport rollers 30. The two adjacent driven transport rollers 30 which are in engagement with and driven by the friction drive wheel 66 in turn are in driving peripheral contact relation with additional friction drive wheels 84 mounted on transverse rods or shafts 86 and provided with a peripheral O-ring friction member or tire 88 with each of the friction drive wheels 84 being located adjacent the center of the rollers 30 whereas the friction drive wheel 66 is located adjacent one end thereof as illustrated in FIG. 3. As shown in FIG. 1, no driving wheel 84 is used between the endmost rollers 30 in adjacent zones thus separately driving the rollers in each zone with all of the zones being driven from the line shaft 32 by the friction drive assemblies 47. However, as illustrated in FIG. 4, the friction drive wheels 84 transmit rotating force or torque from one transport roller 30 in the same zone to another so that all of the transport rollers 30 in the same zone are, in effect, drivingly interconnected for rotation at the same speed with each driving interconnection between adjacent rollers and with the driving connection between the friction drive wheel 66 and its associated pair of rollers 30 being in the form of a friction drive.

Figure 6:
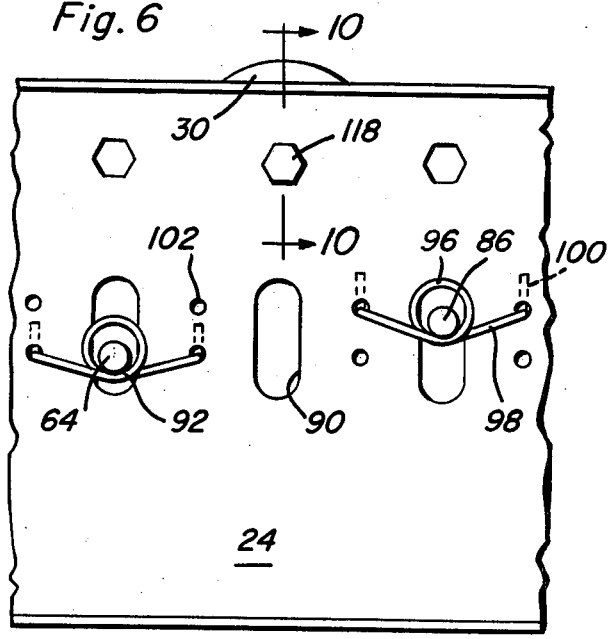
FIG. 6 is a fragmental side elevational view illustrating the torsion springs supporting one end of the friction wheel shafts in the frame of the conveyor.
Figure 7:
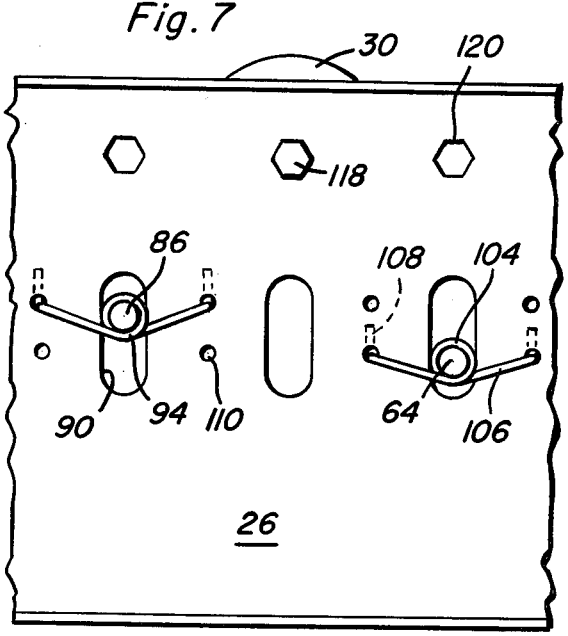
FIG. 7 is a fragmental side elevational view of the opposite ends of the friction wheel shafts illustrating the torsion spring supports therefor to allow translatory movement, and to restrict rotational movement.
Figure 8:
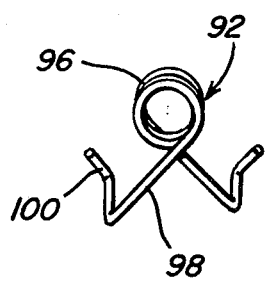
FIG. 8 is a perspective view of the torsion spring for resiliently and floatingly supporting the ends of the wheel shafts illustrated in FIG. 6.
Figure 9:
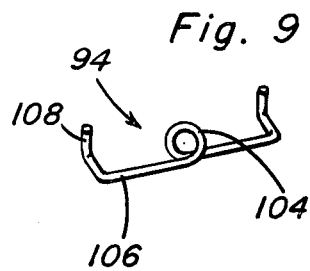
FIG. 9 is a perspective view of the torsion springs utilized in supporting the ends of the wheel shafts as illustrated in FIG. 7.

As illustrated in FIGS. 6 and 7, the ends of the rods or shafts 64 and 86 are received in vertically elongated slots 90 in the side rails 24 and 26, respectively. A torsion spring generally designated by numeral 92 supports the ends of the shafts 64 and 86 from the side rail 24 and torsion springs generally designated by numeral 94 are used to support the ends of the shafts 64 and 86 from the side rail 26. The torsion spring 92 includes a coil spring 96 having a plurality of convolutions therein and provided with an interior diameter greater than the diameter of the shafts 64 and 86. Downwardly diverging spring arms 98 extend from the convolutions 96 and terminate in laterally extending hook-shaped ends 100 which are received in small apertures 102 in the side rail 24 with there being two pairs of apertures illustrated at different heights in relation to the slots 90. The torsion spring 94 also includes a single convolution 104 at its center which has a diameter slightly less than the diameter of the shafts 64 and 86. A pair of tangential arms 106 terminating in laterally extending hook-shaped ends 108 is provided with the diameter of the convolution 104 being slightly enlarged when the arms 106 are flexed in a manner to unwind the convolution so that the spring convolution 104 will grip the shafts 64 or 86 to prevent it from rotating. The hook-shaped ends 108 are received in openings 110 which are similar to the openings 102. As illustrated, the two pairs of openings 102 and 110 are provided inasmuch as the drive wheel 66 is slightly larger in diameter than the drive wheels 84 thus requiring the lower sets of openings 102 and 110. The dimensional relationship of the two sets of openings 102 may vary. The relationship shown was made in order for the spindle 54 to pass under an adjacent shaft 86, as illustrated in FIG. 4. In other constructions having differently arranged components, the drive wheel 66 may be the same diameter as the drive wheel 84, thus eliminating the necessity of the two pairs of holes. In any event, the torsion spring 92 floatingly supports the end of the shaft 64 or shaft 86 in the slot 90 and resiliently biases the shafts 64 and 86 upwardly to maintain a resilient bias of the drive wheels 66 and 84 against the rollers 30. At the other end of the shafts 64 and 86, the torsion spring 94 grips the shaft 64 and 86 to prevent them from turning but the resiliency of the arms 106 enables translatory movement of the end portions of the shafts 64 and 86, that is, biases them upwardly but enables pivotal or swinging movement so that the drive wheels will drive the rollers without tending to bind the rollers.

The rollers 30 are of conventional construction and are in the form of spring-loaded rollers in the roller tubes and axles can move axially with respect to each other for a limited distance. Of course, other conventional rollers may be used.

Figure 10:
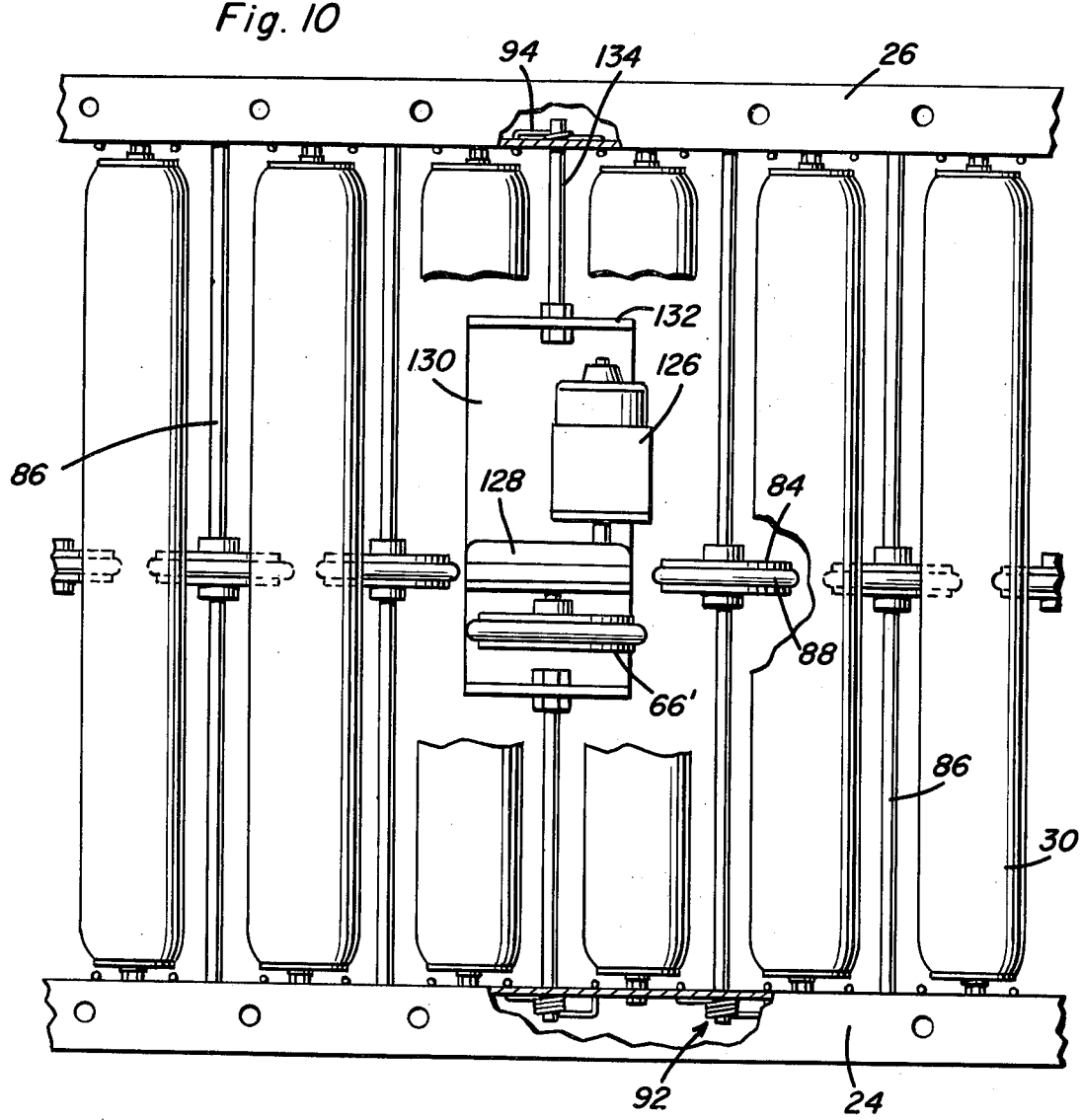
FIG. 10 is a fragmental plan view of another embodiment of the live roller conveyor with portions of the transport rollers broken away illustrating the drive wheels and the small electric motor for driving one of the drive wheels.
Figure 11:
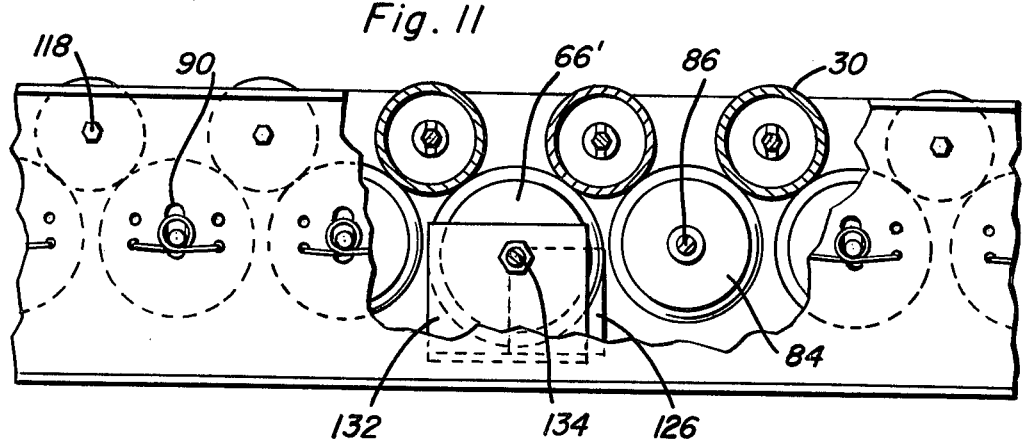
FIG. 11 is a side elevational view of the construction of FIG. 10 with portions thereof broken away illustrating further structural details of the drive wheels and rollers.

FIGS. 10 and 11 disclose a modified embodiment of the drive structure for the rollers in which the rollers 30 and the drive wheels 84 are the same as in FIGS. 1–9. Also, the drive wheel 66 is the same except that it is moved toward the center of the conveyor and is designated by numeral 66' and is drivingly connected to a small electric motor 126 through a reduction gear drive mechanism 128. The motor 126, reduction gear mechanism 128 and drive wheel 66' are all supported from a channel-shaped support member 130 having upturned end walls 132 which are fixedly secured to stub shafts or rods 134 which extend through slots 90 in the side rails 24 and 26 and are supported by the torsion springs 92 and 94 in exactly the same manner as the shaft 66 in FIGS. 1–9. Other than the friction drive wheel 66' being relocated, the remainder of the drive wheels 84, supporting shafts 86, rollers 30 and frame structure remains the same as that embodiment illustrated in FIGS. 1–9 with, of course, the drive line shaft and drive motor therefor and the friction clutch drive connection to the line shaft being omitted and a small motor utilized for driving the friction drive wheel 66' with this motor being a commercially available motor. FIGS. 12–15 disclose a means to pull the shafts 64 or 64' on which the drive wheels 66 or 66' are mounted downwardly to disengage the drive wheels 66 or 66' from their frictional contact with the rollers 30.

FIG. 12 is a plan view of a portion of the conveyor illustrating two complete zones of rollers and a portion of a third zone of rollers. Each zone has a load sensing means denoted generally by reference numeral 140 at its down stream end, means for transmitting a signal when the load is sensed, and means denoted generally by reference numeral 141 to pull the shafts 64 downwardly when the signal is received.

FIG. 13 shows one embodiment of the load sensing drive 140. A limit switch 142 and its attached arm 143 are mounted between two rollers 30 so that the top of the arm extends above the pass line of the rollers. When a load strikes the arm it depresses it, which closes the limit switch contact creating a current to flow in the electric circuit connecting the limit switch 142 to the shaft depressing mechanism 141.

The shaft depressing means 141 as depicted in FIG. 14 consists of a small solenoid 144 mounted on the inside of frame 24, and directly above the shaft 64 or 134. The armature of the solenoid 145 is equipped with a cylindrical plastic end piece 146 which is normally positioned just above the shaft 64 or 134.

When the electrical circuit between the solenoid 144 and the limit switch 142 is closed, the solenoid armature 145 extends pushing the end of the shaft 64 or 134 downward. When the shaft is lowered, the friction drive wheel 66 or 66' is lowered until it no longer contacts and drives the rollers 30 which it normally contacts. The drive wheel is held out of the contact with the rollers 30 as long as the limit switch 142 remains closed. When the load which depresses the arm 143 is transported forward, and passes off the arm, the arm raises to its normal position, the limit switch contact opens, opening the circuit to the solenoid. The solenoid armature retracts, the friction drive wheel raises into contact with the rollers 30, and the zone is again driven.

When a load activates the sensor of one zone, the shaft depressing mechanism of the next zone upstream is actuated, removing power from this zone of rollers. If the first load is prevented from moving forward by a stop, following loads successively activate the sensors of upstream zones, successively removing power from zone after zone. This allows long lines of loads to be accumulated without pressure being exerted between the loads.

In one embodiment of the invention, the adjustment of the friction clutch provides for effective control of the clutch pressure and thus the torque transmitted to the transport rollers. In the other embodiment, the small electric motor and its controller are designed so that the electric motor will stall when the torque required to turn the friction drive wheel 66' exceeds a chosen value. This torque value is chosen to be less than that which would cause the friction wheel 66' to slip at its points of contact with the rollers 30 which it drives, if these rollers were prevented from turning. The combination of a low voltage DC motor and controller provide one simple and economical means of providing the controlled maximum torque. A torque limiting clutch may be inserted between the drive motor and the friction drive wheel 66' as an alternate means of limiting the maximum torque which can be transmitted.

Means may be provided for lifting the friction driven wheel 48 off of the line shaft, rather than depressing the shaft 64 or 134. Sensing means in one zone interconnected to means for lifting the friction driven wheel in the next zone upstream may be provided. This mechanism operates similarly to that described above, to allow accumulation of loads without producing pressure between the loads.

The various drive wheels may be constructed of plastic material, such as "Delrin", but it is desirable that the friction driven wheel 48 be constructed of metal so that the mass of the wheel will effectively retain the wheel against the shaft for driving engagement therewith. The dimensional characteristics of the various components may vary depending upon the size requirements in each installation and the side rails are illustrated with holes punched therein so that each side rail is identical but this may be varied depending upon the installation requirements and various bearings, lubrication facilities, and the like, may also be provided, as desired. Also, the number of rollers 30 in each zone may be varied depending upon the installation requirements with the nominal number of rollers 30 being driven by each drive wheel 66 or 66' being anywhere from six to ten rollers.

This type of conveyor provides that the rollers will not continue to rotate when a load thereon has been stopped, thereby eliminating damage to the load and the tendency of the load to slid sideways off of the load bed, which sometimes occurs when rollers in an accumulating conveyor continue to rotate when the load has stopped. This problem is particularly prevalent when a series of boxes are being moved along the load bed. By providing the rotational support for the drive wheels and rollers on the shafts or rods which are rotationally stationary, relatively lightweight side rails may be employed with these rails being constructed of lightweight metal, such as aluminum alloys, steel, or the like, thereby reducing the weight factor of the conveyor section and maintaining the cost thereof at a minimum.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In an accumulating conveyor including a frame and a plurality of transport rollers disposed in adjacent spaced relation and rotatably supported by the frame, the improvement comprising friction drive wheels rotatably supported by the frame in peripheral contact with the rollers for drivingly interconnecting all of the rollers, with each drive wheel being in contact with two adjacent rollers, means driving at least one of said drive wheels for imparting drive torque to the rollers and the other drive wheels, and means supporting said drive wheels from the frame for biasing the drive wheels into driving engagement with the rollers, said means biasing the drive wheels toward the rollers including supporting shaft means for each of said drive wheels with the shaft means being supported from said frame, means engaged with each end of the drive wheel shaft means and connected with the frame for biasing the shaft means and drive wheels toward the rollers, said means at one end of each of said shaft means including a multiple convolution spring having a diameter greater than the shaft means to floatingly and resiliently support one end of the shaft means, the means at the other end of the shaft means including a single convolution spring having a diameter smaller than the shaft means for expansion of the convolution when assembling the spring on the shaft means for gripping the shaft means to prevent rotation thereof and resiliently supporting the shaft means for translatory movement in relation to the frame.

2. The structure as defined in claim 1 together with means for selectively engaging and disengaging said at least one of said drive wheels with respect to the rollers to provide positive load transport control.

3. The structure as defined in claim 2 wherein said means driving said at least one of said drive wheels includes a drive train from a power source to said at least one of said drive wheels, said means for selectively engaging and disengaging including solenoid operated means to move the shaft means for said at least one of said drive wheels.

4. The structure as defined in claim 3 wherein said power source includes an electric motor, bracket means supporting the electric motor, drive train and said at least of said drive wheels from said supporting shaft means for said at least one of said drive wheels.

5. The structure as defined in claim 3 together with a load sensing means associated with the rollers, said load sensing means being connected with said selective engaging and disengaging means for controlling driving forces imparted to the rollers.

6. The structure as defined in claim 5 wherein said load sensing means includes an arm extending above the rollers for engagement by a load on the rollers, said arm being depressible by the load, means associated with said arm to operate said means for selectively engaging and disengaging said at least one of said drive wheels.

7. The structure as defined in claim 1 wherein said means driving said at least one of said drive wheels includes an elongated line shaft supported from the frame below the rollers and drive wheels in perpendicular relation to the rotational axes of the rollers and drive wheels, and friction drive means interconnecting the line shaft and said at least one of said drive wheels, said friction drive means including a friction driven wheel having a periphery in frictional driving engagement with the periphery of the line shaft, said friction driven wheel including a spindle and friction plate rigid therewith and rotatably supported on a pivotally mounted support shaft overlying the line shaft and disposed in alignment therewith whereby gravity retains the friction driven wheel against the line shaft, said at least one of said drive wheels, having its periphery engaged by the friction plate and forming a friction clutch between the friction driven wheel and said at least one of said drive wheels.

8. In an accumulating conveyor having a frame with generally parallel side rails and a plurality of transport rollers rotatably supported from the side rails, that improvement comprising a drive assembly for the rollers, said drive assembly including an elongated line shaft underlying the rollers in perpendicular relation thereto and supported from the frame for rotation, a friction wheel supported above the line shaft and including a friction peripheral surface in contact with the line shaft for driving the friction wheel from the line shaft, means supporting the friction wheel for movement toward and away from the line shaft and drive means interconnecting the friction wheel and the rollers for transmitting driving torque from the friction wheel to the rollers, said means supporting the friction wheel including a shaft supported from said frame for pivotal movement about a transverse axis above and perpendicular to the line shaft whereby gravity will retain the friction wheel against the periphery of the line shaft, said means transmitting driving torque from the friction wheel to the rollers including a friction clutch including a substantially circular plate having a flat surface driven by the friction wheel, a drive wheel having a periphery in friction driving engagement with the flat surface of the plate and in driving engagement with at least one of said rollers, and a plurality of drive wheels frictionally engaging adjacent rollers to transmit torque from one roller to another, thus driving a plurality or rollers from a single friction wheel engaged with the line shaft.

9. The structure as defined in claim 8 together with adjustable means biasing the plate toward the periphery of said drive wheel thereby enabling variation in the friction clutch drive between the plate and the periphery of said drive wheel.

10. The structure as defined in claim 8 wherein said shaft supporting the friction wheel is supported for pivotal movement about a transverse axis coincident with the rotational axis of the drive wheel having its periphery in friction and driving engagement with the flat surface of the plate to maintain the flat surface of the plate in tangential relation to the periphery of the drive wheel, and spring means biasing said plate toward the periphery of the drive wheel which it engages to maintain a driving relation therebetween.

* * * * *